US012025395B2

(12) United States Patent
Richardson

(10) Patent No.: US 12,025,395 B2

(45) Date of Patent: Jul. 2, 2024

(54) ELECTRONIC GUNFIRE SIMULATION DEVICE

(71) Applicant: Scenario Trainer Inc., Mayfield Heights, OH (US)

(72) Inventor: Timothy Paul Richardson, Mayfield Heights, OH (US)

(73) Assignee: Scenario Trainer Inc., Mayfield Heights, OH (US)

( * ) Notice: Subject to any disclaimer, the term of this patent is extended or adjusted under 35 U.S.C. 154(b) by 803 days.

(21) Appl. No.: 17/093,701

(22) Filed: Nov. 10, 2020

(65) Prior Publication Data

US 2021/0180906 A1 Jun. 17, 2021

Related U.S. Application Data

(60) Provisional application No. 62/933,456, filed on Nov. 10, 2019.

(51) Int. Cl.

*F41A 33/04* (2006.01)
*F41A 33/02* (2006.01)
*G10K 15/06* (2006.01)

(52) U.S. Cl.

CPC .............. *F41A 33/04* (2013.01); *F41A 33/02* (2013.01); *G10K 15/06* (2013.01)

(58) Field of Classification Search

CPC .......... F41A 33/04; F41A 33/02; G10K 15/06
USPC ........................................................... 434/16
See application file for complete search history.

(56) References Cited

U.S. PATENT DOCUMENTS 3,979,740 A * 9/1976 Forbat .................. G08B 13/122 340/529
5,903,518 A * 5/1999 Benwell ................. G01V 1/157 367/147
2007/0026364 A1* 2/2007 Jones ...................... F41A 33/02 434/11
2014/0306818 A1* 10/2014 Batchelder ............ G08B 15/02 340/501

(Continued)

FOREIGN PATENT DOCUMENTS

CN 202393297 U 8/2012

OTHER PUBLICATIONS

Inert Products, LLC, Category: Gunfire Simulation, Realistic Training Saves Lives, webpage, https://inertproducts.com/product-category/battlefield-effects/gunfire-simulation/, accessed Mar. 9, 2021, 2 pages.

(Continued)

*Primary Examiner* — Robert P Bullington
*Assistant Examiner* — Stephen Alvesteffer
(74) *Attorney, Agent, or Firm* — Standley Law Group LLP; Jeffrey S. Standley; Kenny W. Pung

(57) ABSTRACT

An electronic device for simulating gunfire. The device includes a discharge chamber, a first electrode, and a second electrode. A high voltage circuit may be connected to the first and second electrodes, and may be configured to generate an electrical arc between the first and second electrodes, thereby creating percussive sounds that travel through the opening in the body. Also disclosed are embodiments where multiple discharge chambers are provided to generate electrical arcs in various discharge sequences, as well as embodiments where the device incudes a housing that is shared as a rifle scope or an AR upper barrel assembly.

13 Claims, 5 Drawing Sheets

(56) References Cited

U.S. PATENT DOCUMENTS

| | | | | |
|---|---|---|---|---|
| 2018/0071645 | A1* | 3/2018 | Hugill | A63H 5/00 |
| 2018/0259285 | A1* | 9/2018 | Galie | F41A 17/06 |
| 2019/0246482 | A1* | 8/2019 | Zimmerman | H01J 37/32568 |

OTHER PUBLICATIONS

EPE Equip, Gunfire Simulator, webpage, https://www.epequip.com/catalogue/replica-ordnance-and-training-aids/battlefield-effects/gunfire-simulator/, accessed Mar. 9, 2021, 1 page.

* cited by examiner

ELECTRONIC GUNFIRE SIMULATION DEVICE

CROSS-REFERENCE TO RELATED APPLICATIONS

This application is a nonprovisional patent application that makes a priority claim to U.S. Provisional Application No. 62/933,456.

FIELD

The application relates to devices for simulating gunfire and, more particularly, to electronic devices for simulating gunfire that do not require consumable materials.

BACKGROUND

Active shooter training is commonly employed to train police officers, military personnel, and private citizens on how to respond in the event there is an active shooter. By undergoing such training, a trainee may learn how to remain composed in the presence of gunfire while also improving his/her ability to react quickly and appropriately. The effectiveness of active shoot training depends, at least in part, on the realism of the training methods. Towards this end, some training methods may incorporate the use of live rounds. However, in many cases it is often impractical or otherwise dangerous to do so, such as when training indoors or in close proximity. For this reason, devices/systems/methods for simulating gunfire often finds utility.

There currently exist several different methods of simulating gunfire. For example, gunshot sounds may be amplified with speakers (e.g., a PA system) or replicated by firing simulation/blank rounds, firing paintball guns, popping balloons, clapping pieces of wood together, and the like. In any case, these methods often leave much to be desired due to being dangerous (e.g., excessive decibel levels causing hearing loss without protection, residual damage to facilities/surroundings, etc.), not realistic (e.g., failure to elevate adrenaline levels and heart rates, lack of percussion or shockwave force, etc.), or otherwise unsuitable (e.g., extensive setup time, consumable costs, etc.).

Accordantly, those skilled in the art continue with research and development efforts in the field of gunfire simulation devices.

SUMMARY OF THE INVENTION

Disclosed are devices for simulating gunfire that include at least one discharge chamber and a high voltage circuit.

In one exemplary embodiment of the present invention, the device includes a discharge chamber that comprises a body, a first electrode, and a second electrode. The body defines an interior and includes an opening into the interior. The first and second electrodes each extend through the body such that the first and second electrodes each define a first end that is exposed to the exterior of the body and a second end that protrudes into the interior. The high voltage circuit is electrically connected to the first ends of the first and second electrodes, and is configured to generate an electrical arc between the second ends of the first and second electrodes to produce percussive sounds that travel through the opening in the body of the discharge chamber.

In another exemplary embodiment of the present invention, the device includes a plurality of discharge chambers, a capacitor bank, a transformer, and a micro controller. Each discharge chamber of the plurality of discharge chambers includes a body, an interior defined by the body, and an opening in the body that extends into the interior. Each discharge chamber further includes a first electrode and a second electrode, wherein the first and second electrodes each extend through the respective bodies of the discharge chambers such that the first and second electrodes each define a first end that is exposed to the exterior of the respective bodies and a second end that protrudes into the respective interiors. The capacitor bank is electrically connected to the first end of a first electrode of a discharge chamber, and is configured to retain an electrical charge. The transformer is electrically connected to the first end of a second electrode, and is configured to step up the voltage from a micro controller. The micro controller is operatively connected to the capacitor bank and the transformer, and is configured to direct when the transformer loads a high voltage onto the second electrode, as well as when the capacitor bank discharges an electrical charge through the first electrode.

In yet another embodiment of the present invention, the device includes a discharge chamber, a high voltage circuit, and a housing that house the discharge chamber and the high voltage circuit. The housing includes a discharge port that includes a plurality of openings. The discharge chamber includes a spark electrode that is configured to generate an ignition spark to create a quantity of ionized air when a current is supplied to the spark electrode, and an arc electrode that is configured to generate an electrical arc that extends through the quantity of ionized air when a current is supplied to the arc electrode. The high voltage circuit is configured to supply a current to the spark electrode and the arc electrode. Igniting the quantity of ionized air creates a percussive sound, a flash of light, and a shockwave of rapidly displaced air, each of which travels through an opening of the plurality of openings in the discharge port.

Other examples of the disclosed device for simulating gunfire will become apparent from the following detailed description, the accompanying drawings and the appended claims.

DETAILED DESCRIPTION

Figure 1:
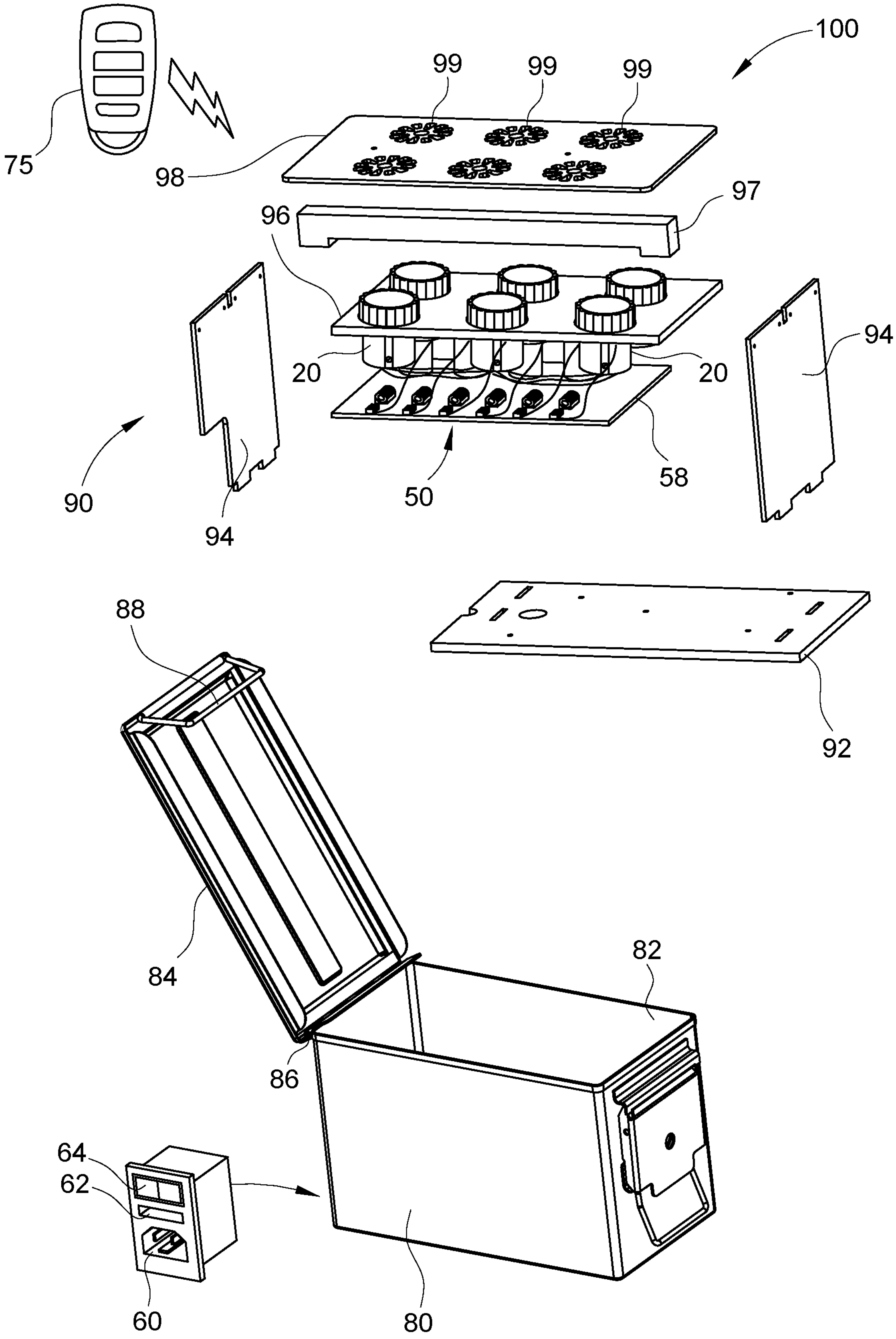
FIG. 1 is an exploded top perspective view of a first embodiment of the electronic gunfire simulation device.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

The present invention comprises a gunfire simulation device 100 (herein, the "device") that may be utilized to simulate the sound and sensation of gunfire. Upon actuation, the device 100 discharges high voltage arcs (i.e., electrical arcs) within one or more discharge chambers 20 to produce percussive sounds created as a result of the arcs. In preferred embodiments, these percussive sounds may substantially match the sound profile of an actual gunshot. The arcs may also produce bright flashes and shockwaves of rapidly displaced air that contribute to the overall feel of a gun being fired. It is contemplated that the device 100 may be used, for example, to create realistic training scenarios for active shooter response preparation and force-on-force drills. Other use cases may include pest control (e.g., when placed in sea gull territory or airport runways), disorienting active threats (e.g., when remotely triggered, thereby creating a façade of firepower even when no guns are present), deterring criminals (e.g., when triggered by a sensor, similar to alarm lights and sirens), and the like.

Figure 2:
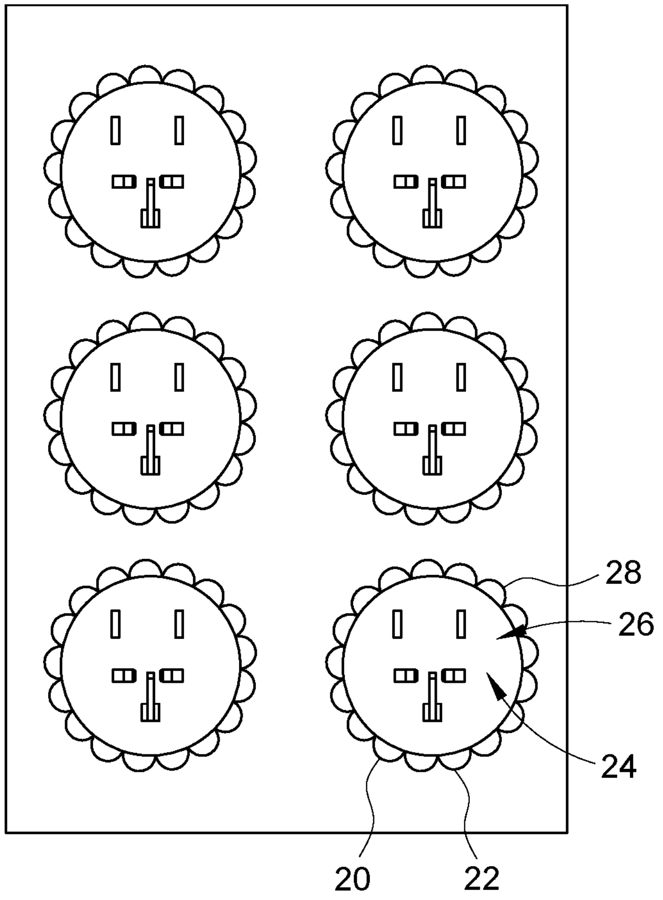
FIG. 2 is a top plan view of the discharge chambers of the device of FIG. 1.
Figure 3:
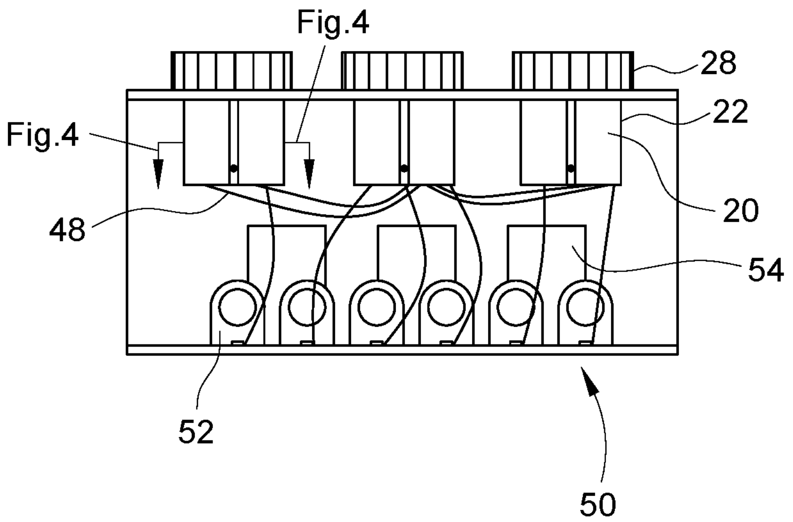
FIG. 3 is a side elevation view of a portion of the device of FIG. 1, showing the discharge chambers and the high voltage circuit.

Referring to the embodiment of FIGS. 1-3, the present invention includes the device 100, a plurality of discharge chambers 20 (six being shown), a high voltage electrical circuit 50 connected to each of the discharge chambers 20, and a housing 80 that houses the discharge chambers 20 and the electrical circuit 50. Since multiple discharge chambers 20 are provided, it is contemplated that the device 100 of this embodiment may be configured to generate series of high voltage arcs across each of the discharge chambers 20 in various discharge sequences. For example, the device 100 may be configured to discharge electrical arcs in each of the six discharge chambers 20 simultaneously. Doing so may simulate the sound of a single, particularly loud shot being fired. In another example, the device 100 may be configured to discharge electrical arcs across the discharge chambers 20 sequentially, thereby simulating the sound of a gun being rapidly fired (e.g., the sound made by semi or fully automatic guns). As those skilled in the art will appreciate, various other discharge sequences (that simulate various other shooting patterns/profiles) may also be employed, additionally or alternatively, without departing from the scope of the present disclosure.

The discharge chambers each include a body 22, an interior 24 defined by the body 22, and an opening 26 in the body 22 that extends into the interior 24. While not meant to be limiting, the body 22 may be generally cup-shaped and may include a ribbed upper lip 28 for ease of handling. Preferred materials for the body 22 include non-conductive, non-flammable, and heat-resistant materials such as, but not limited to, heat resistant plastic, ceramic, combinations thereof, and/or the like. Those skilled in the art will appreciate, however, that design features of the discharge chambers 20, such as size, shape, and material composition, may be varied without departing from the scope of the present disclosure.

Figure 4:
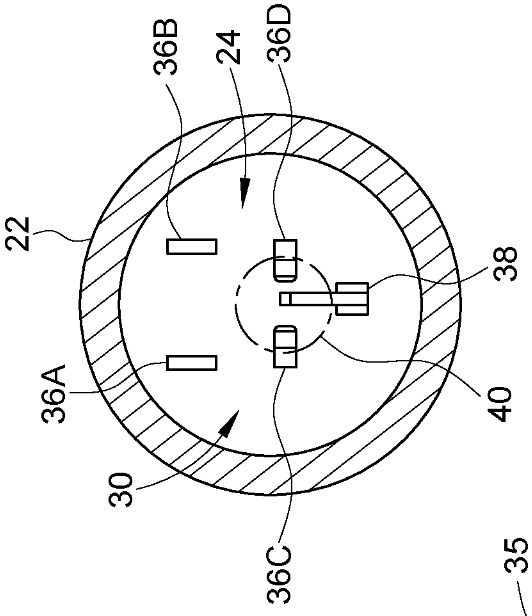
FIG. 4 is a cross-sectional top plan view of a discharge chamber of the device of FIG. 1.
Figure 5:
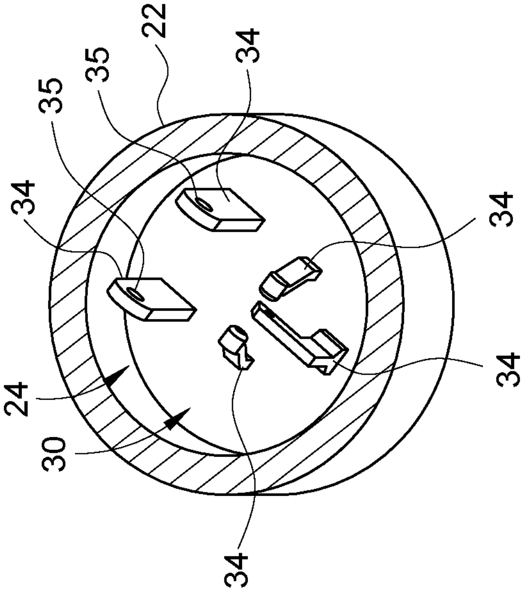
FIG. 5 is a top perspective view of the discharge chamber of FIG. 4.
Figure 6:
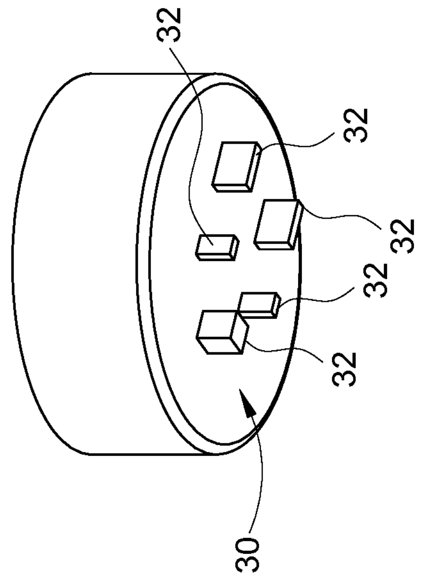
FIG. 6 is a bottom perspective view of the discharge chamber of FIG. 4.

Referring to FIGS. 4-6, the discharge chambers also include a plurality of electrodes 30 (five being shown) that extend through the body such that each electrode has a first end 32 that is exposed to the exterior of the body 22 (shown in FIG. 6 as being disposed along the bottom of the body) and a second end 34 that protrudes into the interior (FIG. 5). By connecting the first ends 32 to the electrical circuit 50 (via wires 48) and transferring electricity through the electrodes 30, the device 100 may produce electrical arcs between the second ends 34 and create percussive sounds, flashes, and/or shockwaves that travel through the opening 26 in the body 22.

In general, the plurality of electrodes 30 may include arc electrodes 36 and spark electrodes 38. The spark electrodes 38 may, upon actuation of the device 100, generate ignition sparks (e.g., small electrical arcs) to create a quantity of ionized air within the interior 24 of a discharge chamber 20. In turn, the arc electrodes 36 may be utilized to create electrical arcs that extend through the quantity of ionized air. As those skilled in the art will appreciate, electrical arcs are created when an electrical current is established through air, despite air being a generally non-conductive medium. Without being bound by any particular theory, it is believed that the creation of ionized air facilitates the subsequent creation of electrical arcs because ionized air is more electrically conductive than regular, non-ionized air (therefore being better suited for the establishment of a current).

Referring now specifically to the embodiment shown (FIG. 4), the discharge chamber 20 may include four arc electrodes 36A-D, disposed in a generally squared/rectangular arrangement, and a single spark electrode 38 in close proximity to one of the arc electrodes (e.g., arc electrode 36D, on the bottom right). This configuration provides for the creation of electrical arcs that extend between arc electrodes 36A and 36B, and between arc electrodes 36C and 36D. Arc electrodes 36A and 36C may be positive ends whereas arc electrodes 36B and 36D may be negative ends (though other configurations are certainly possible). The difference in height between these arc electrodes (arc electrodes 36A and 36B are taller than arc electrodes 36C and 36D) provides for separation between the resulting electrical arcs. These arc electrodes 36A-D may also be provided with an opening 35 disposed along their distal ends (i.e., the distal ends of their second ends 34) to help control the electrical arcs, and to prevent and/or limit heat damage. The close proximity between the spark electrode 38 and arc electrode 36D facilitates the creation of ignition sparks due to there being less air (a nonconductive medium) between them.

The discharge chamber 20 may also include a rare earth magnet 40 either embedded within the body 22 of the discharge chamber or positioned proximate (i.e., at or near) to it. As those skilled in the art will appreciate, electrical arcs will normally produce a quantity of plasma comprised of free electrons and ions. The rare earth magnet 40 may, in effect, generate a strong magnetic force that can help contain or direct the free electrons and ions within the interior 24 of the discharge chamber 20, thereby preventing them from escaping and possibly damaging the internals of the device 100 and/or posing a safety risk to a user. As shown, this magnet 40 may be generally circular in shape and disposed between the spark electrode 38 and arc electrodes 36C and 36D.

Figure 7:
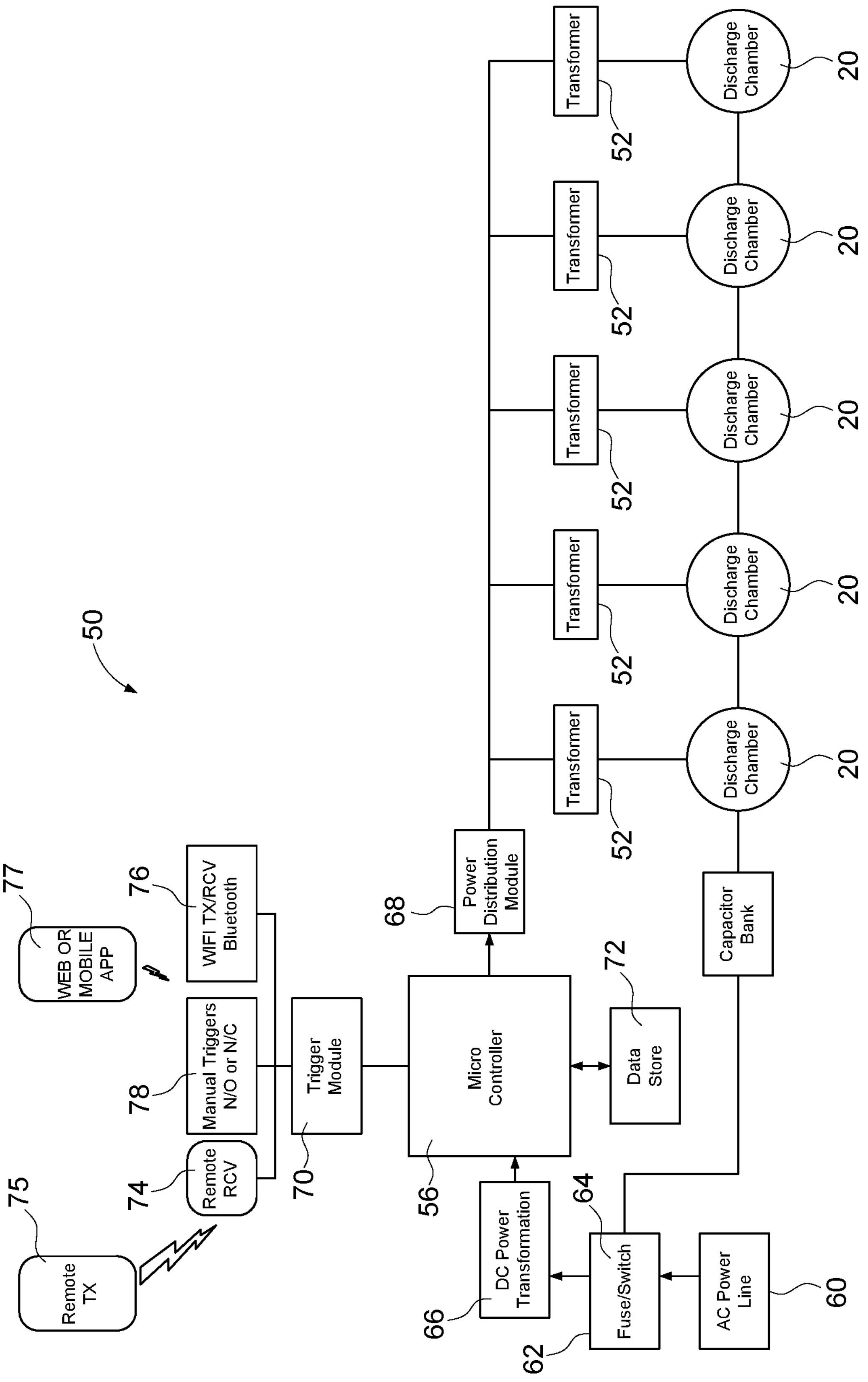
FIG. 7 is a schematic illustration of the high voltage circuit of FIG. 1.

Referring to FIG. 7, the device 100 includes a micro controller 56, at least one transformer 52 (six being shown), and at least one capacitor bank 54 (three being shown). The micro controller 56 may, among other things, actuate the device 100 and regulate power output (e.g., to prevent over heating). While in operation, the micro controller 56 may active the transformers 26 to apply a high voltage to the spark electrode 38, thereby generating an ignition spark. Preferably, a voltage of about 280 volts to about 440 volts, but more preferably voltage of about 320 volts to about 400 volts, may be applied to the spark electrode 38. The transformer may be, for example, a five-coil transformer. The capacitor bank 54 may be configured to load high voltage onto the arc electrodes 36 to enable the generation of electrical arcs. A suitable capacitor bank may include four 1,000 microfarad capacitors, wired in parallel, and configured to apply a voltage of about 280 volts to about 360 volts, but preferably about 320 volts, to arc electrodes 36A and 36C of each of the discharge chambers (i.e., all six). Other embodiments may include different capacitor bank configurations, with either more or less capacitors and/or capacitors of different sizes, without departing from the scope of the present disclosure. These components 52, 54, 56 may be installed onto a motherboard 58 and supplied power from an A/C input port 60 (i.e., the power supply). The A/C input port 60 may be provided with a fuse 62 and an on/off switch 64, as well as a D/C power transformer 66 for converting supplied current. An appropriate cable may be provided to connect the A/C input port 60 to, for example, a conventional wall outlet. Those skilled in the art will appreciate that this is just one non-limiting example as other types of power supply (e.g., batteries and a power inverter) may also be utilized.

The micro controller 56 may be operatively connected to a power distribution module 68 and a trigger module 70. The power distribution module 68 may be electrically connected to the transformers 52 and configured to supply power to each when needed (e.g., when triggered). The trigger module 70 may enable control of the device 100 by directing when high voltage is loaded onto the arc electrodes 36 (from the capacitor bank 54) and the spark electrode (from the transformers 72). In preferred embodiments, the trigger module 70 may be configured to provide for a variety of different discharge sequences, such as discharging the transformers 52 and/or capacitor bank 54 simultaneously, randomly, sequentially, and/or any combinations thereof. A data store 72 may be also provided to store these discharge sequences, as well as discharge counts and timestamps.

To actuate the device, the trigger module 70 may incorporate any one or more of a variety of triggering mechanisms. In one embodiment, the trigger module 70 may be provided with a wireless receiver 74 that is in communication with a remote controller 75. A user may push a button and/or touch screen on the remote controller 75 to instruct the micro controller 56 to activate the transformers 52 and discharge the capacitor banks 54. Further, it is contemplated that the micro controller 56 and the remote controller 75 may be programmed to provide channels for a variety of different shot profiles. For example, the remote controller 75 may be provided with a first channel that fires one shot (i.e., causes the device 100 to discharge once) with each press of a button at manual frequency. This channel may be used to simulate a semi-automatic firing sequence. In another example, the remote controller 75 may be provided with a second channel that triggers a series of two 3-shot bursts. In yet another example, the remote controller 75 may be provided with a third channel that triggers a 6-shot series. Preferably, the remote controller 75 may also be provided with a fourth channel that halts all active sequences.

In a second embodiment, the trigger module 70 may be provided with a wireless transmitter/receiver 76 configured to communicate with an electronic device 77 (e.g., a computer or smartphone) over a wireless network (e.g., Internet of Things networking such as WIFI or Bluetooth). It is contemplated that such a configuration may enable the electronic device 77 to operate with multiple devices 100 simultaneously, or may otherwise be desired for installations that require remote controlled operation. Preferably, the electronic device 77 may also be provided with computer applications or software, including internet-based applications such as web browsers, that enables a user to interface with the device 100.

In a third embodiment, the trigger module 56 may be configured for manual triggering by way of a N/O (normally on) contact terminal and/or a N/C (normally closed) contact terminal 78. The trigger module 56 may be wired so that the device 100 discharges when a N/O circuit is closed or a N/C circuit is opened (e.g., when a particular wire is cut). It is contemplated that such a configuration may find utility with applications involving bomb disarming training and practice.

The micro controller 56 may set and/or alter the number of discharge chambers 20 to be discharged simultaneously. By this functionality, a user of the device 100 may be enabled control the volume of the percussive sound, the brightness of the flash, and/or the severity of the shockwave. For example, a user may program the device 100 to produce a percussive sound of about 130 decibels to about 150 decibels by discharging two to four discharge chambers 20 simultaneously. In another example, the user may program the device 100 to produce a percussive sound of about 125 decibels, which is considered safe for human ears, by discharging one discharge chamber 20. 150-165 decibel output may be achieved by discharging all 6 chambers simultaneously.

Figure 8:
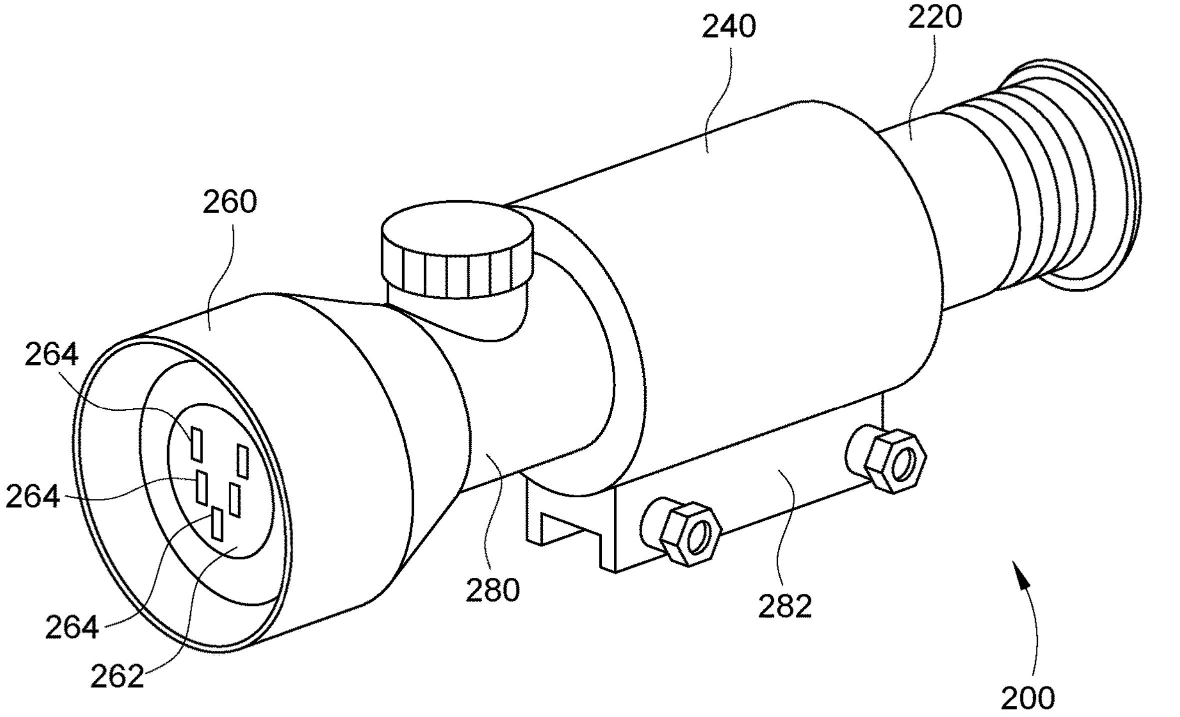
FIG. 8 is a top perspective view of a second embodiment of the electronic gunfire simulation device.
Figure 9:
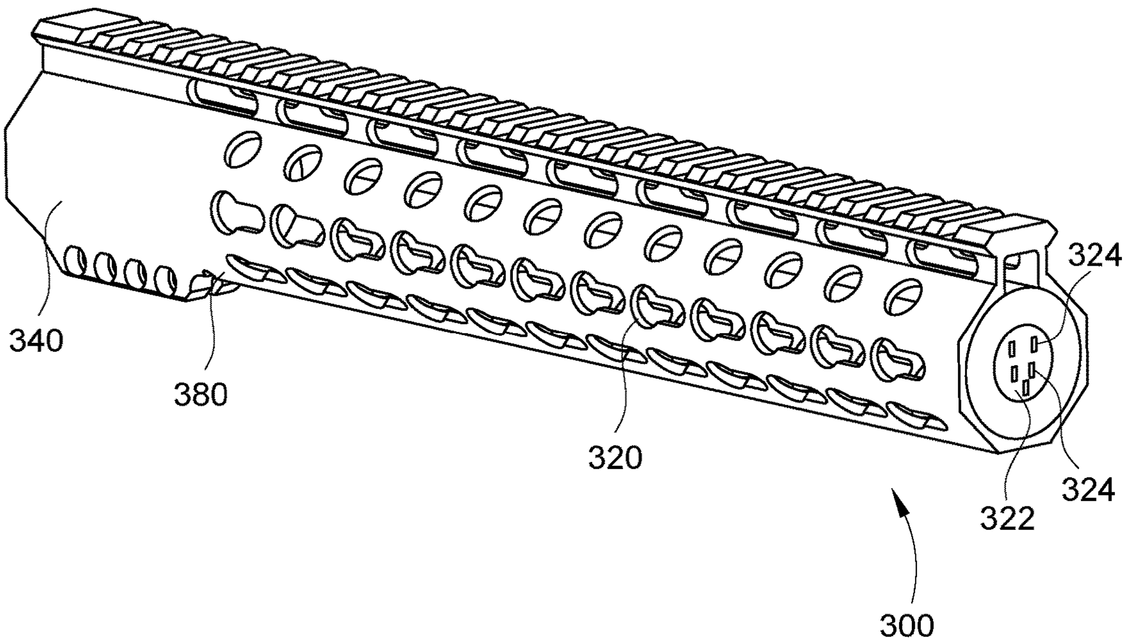
FIG. 9 is a top perspective view of a third embodiment of the electronic gunfire simulation device.

The high voltage circuit 50 and the discharge chamber(s) 20 may be housed within a housing 80. FIG. 1 shows one embodiment of a housing 80, whereas FIGS. 8 and 9 show two others 280, 380. Referring specifically to FIG. 1, the device 100 may include a housing 80 that is shaped as, or may otherwise be, an adapted .50 caliber ammunition canister. This housing 80 may be metal, and may include a receptacle 82 and a lid 84 that is connected by a hinge 86. The lid 84 may be secured onto the receptacle 86 by way of a latch 88. Further, it is contemplated that such a housing 80 may be configured to ground electrical charges that inadvertently build within the housing 80 (as a safety measure). The housing 80 may be connected to a grounding pin in the A/C input port 60 such that, when the device 100 is plugged into a conventional wall outlet (which typically includes a ground socket), the housing 80 may transfer electrical charges through the grounding pin and safely away from the device 100. In an exemplary embodiment, the connection between the housing 80 and the grounding pin in the A/C input port 60 may be established by way of a grounding wire comprising a crimped eyelet on one end that is riveted to the bottom of the housing 80 and connected to the ground pin of the A/C input port 60 on the other end.

To support the high voltage electrical circuit 50 and the discharge chambers 20, the device may also include a plurality of internal brackets 90 (FIG. 1). As shown, these internal brackets 90 may include a base plate 92, a pair of opposing side walls 94, and a raised bracket 96. The base plate 92 may support the motherboard 58 on shock absorbing mounts and the side walls 84. The side walls 94 may extend upwards from the base plate 92 to support the raised bracket 96. The raised bracket 96 may receive the discharge chambers 20 and support them at a height that is raised relative to the motherboard 58. Once the internal brackets 90 have been assembled with the high-voltage electrical circuit 50 and the discharge chambers 20, the completed unit may be inserted in to the receptacle 82 of the .50 caliber ammunition canister from the top.

Further, the device 100 may also be provided with a cover 98 to protect users from dangerous arc branching, and to prevent users from reaching into the discharge chambers 20. This cover 98 may be raised relative to the discharge chambers 20 and supported from beneath by a spacer 97. The cover 98 may also define a plurality of openings 99 disposed generally above the openings 26 of each discharge chamber 20 to permit passage of sound, flashes of light, and/or shockwaves. In preferred embodiments, these openings 99 may be small enough to prevent human fingers from being inserted though the cover 98. While the cover 98 may be fabricated from one or more of a variety of different materials, it is contemplated that stainless steel and heat resistant plastic may be preferred. Optionally, it is also contemplated that smaller, individual covers may be provided for one or more of the discharge chambers 20 (not shown). These smaller, individual covers may be received over the openings 26 of the discharge chambers 20 and contain openings for sound, light, and air to pass though.

As those skilled in the art will appreciate, the embodiment of the device 100 shown in FIGS. 1-7 is not meant to be limiting, and that other configurations for the discharge chambers 20, the high voltage circuit 50, and the housing 80 are certainly possible. These configurations may be suitable in their own right for different use cases. In particular, it is contemplated that embodiments of the device 100 that only include one or two discharge chambers 20 (i.e., "single shot units") may find utility. These embodiments may be smaller, and generally more portable than the device 100 of FIGS. 1-7. Preferably, these embodiments may also be provided with a portable power supply (e.g., battery and power inverter).

Referring to FIG. 8, the present disclosure provides a single shot embodiment of the device 200. As shown, this device 200 includes a housing 280 that is shaped to look like a rife scope, having an eyepiece portion 220, a middle portion 240, and a forward portion 260 that includes a discharge port 262. It is contemplated that this device 200 may include an attachment feature 282 that enables the device to be mounted to, for example, the upper portion of an AR style rifle (e.g., ArmaLite Rifle) by way of a picatinny rail system. In doing so, the device 200 may provide for a sense of directional realism due to the device 200 being aligned (i.e., parallel) with the barrel of the gun. Preferably, the high voltage circuit 50 may be hidden from view by being housed within the middle portion 240, the eyepiece portion 220, or elsewhere in the gun (e.g., in the magazine, the barrel area, etc.). The discharge chamber(s) 20 may be housed within, or may otherwise be, the forward portion 260 of the scope. The discharge port 262 may include a plurality of openings 264 for sounds, flashes of light, and/or shockwaves to exit the device 200. The device 200 may be configured to actuate, for example, when a user pulls the trigger on the gun, or presses a button provided on the gun (e.g., provided near the trigger), or by way of a remote controller 75.

Referring to FIG. 9, the present disclosure provides another single shot embodiment of the device 300. This embodiment 300 may include a housing 380 that is shaped to look like an AR upper and barrel assembly, but may otherwise be similar in configuration to the embodiment 200 of FIG. 8. More specifically, the embodiment 300 of FIG. 9 may include a barrel 320 and an upper portion 340, with a discharge port 322 disposed along the distal end of the barrel 320. The discharge port 322 may also include a plurality of openings 324 for sounds, flashes of light, and/or shockwaves to exit. The barrel 320 itself, or at least a portion thereof, may be the body 22 of a discharge chamber 20, while the high voltage circuit 50 may be housed elsewhere in the barrel 320 or within the upper portion 340. Upon actuation of the device 300, it is contemplated that the back pressure from the electrical discharge may be harnessed to push/cycle a lightweight mechanical slide mechanism (e.g., to simulate the introduction of a fresh cartridge from the magazine). As those skilled in the art will appreciate, similar adaptions may be designed and utilized for other types of firearms, such as shotguns, handguns, and the like.

In one or more embodiments, it is contemplated that speakers or wireless audio transmission (e.g. Bluetooth) may also be provided and operatively connected to the device 100, 200, 300 to play pre-recorded sounds or messages before, after, or during firing. These speakers may add to the overall realism of the simulated gunfire experience by, for example, creating the sound of a slide mechanism being cycled, or the sound of spent brass disks/shells hitting the ground, among other things.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for simulating gunfire comprising:

a housing comprising a discharge port that comprises a plurality of openings;

a discharge chamber housed within the housing, wherein the discharge chamber comprises:

a body, an interior defined by the body, and an opening in the body that extends into the interior;

a first arc electrode and a second arc electrode, wherein the first and second arc electrodes each extend through the body such that the first and second arc electrodes each define a first end that is exposed to the exterior of the body and a second end that protrudes into the interior; and a rare earth magnet proximate the first and second arc electrodes that generates a magnetic field within the interior of the body for affecting the shape of electrical arcs;

a high voltage circuit electrically connected to the first ends of the first and second arc electrodes that is configured to generate an electrical arc between the second ends of the first and second arc electrodes; and an attachment feature provided on the housing that enables attachment of the housing to a gun, wherein the attachment feature is oriented relative to the housing such that the discharge port is facing the same direction of the barrel of the gun;

wherein generating the electrical arc creates a percussive sound, a flash of light, and a shockwave of rapidly displaced air, each of which travels through an opening of the plurality of openings in the discharge port.

2. The device of claim 1 wherein the body of the discharge chamber comprises at least one of a heat resistant plastic and a ceramic.

3. The device of claim 1 wherein the high voltage circuit comprises a capacitor bank that is configured to retain an electrical charge, and to discharge the electrical charge into the discharge chamber.

4. The device of claim 1 wherein the high voltage circuit comprises a transformer that is configured to step up the voltage of the high voltage circuit to about 320 volts.

5. The device of claim 1 wherein the high voltage circuit comprises a micro controller configured to direct when an electrical arc is generated in the discharge chamber.

6. The device of claim 5 wherein the high voltage circuit comprises a trigger module operatively connected to the micro controller that enables a user to actuate the device.

7. The device of claim 6 wherein the trigger module comprises a wireless receiver that is in communication with at least one of a remote controller, a smart phone, and a computer.

8. The device of claim 6 wherein the trigger module comprises at least one of an N/O contact terminal and a N/C contact terminal.

9. The device of claim 1 wherein the device is configured to generate a percussive sound that is about 125 decibels.

10. The device of claim 1, wherein the discharge chamber further comprises a spark electrode configured to generate an ignition spark to create a quantity of ionized air.

11. An attachable device for simulating gunfire comprising:

a housing comprising a discharge port that comprises a plurality of openings;

a discharge chamber housed within the housing, wherein the discharge chamber comprises:

a spark electrode that is configured to generate an ignition spark to create quantity of ionized air when a high voltage is loaded onto the spark electrode; and an arc electrode that is configured to generate an electrical arc that extends through the quantity of ionized air when a high voltage is loaded onto the arc electrode;

a rare earth magnet proximate the arc electrode that generates a magnetic field within the discharge chamber for affecting the shape of electrical arcs;

a high voltage circuit housed within the housing, wherein the high voltage circuit is configured to load a high voltage onto the spark electrode and the arc electrode; and an attachment feature provided on the housing that enables attachment of the housing to a gun, wherein the attachment feature is oriented relative to the housing such that the discharge port is facing the same direction of the barrel of the gun;

wherein generating the electrical arc creates a percussive sound, a flash of light, and a shockwave of rapidly displaced air, each of which travels through an opening of the plurality of openings in the discharge port.

12. The device of claim 11 wherein the housing is shaped as at least one of a rifle scope and an AR upper and barrel assembly.

13. The device of claim 11 wherein the attachment feature is a picatinny rail mount.

* * * * *